W. B. MANN, DEC'D.
C. M. G. MANN, ADMINISTRATRIX.
TRIPLE VALVE.
APPLICATION FILED MAY 14, 1913.

1,177,645.

Patented Apr. 4, 1916.
7 SHEETS—SHEET 7.

UNITED STATES PATENT OFFICE.

WILLIAM BRAYTON MANN, OF BALTIMORE, MARYLAND; CARRIE M. GRACE MANN, ADMINISTRATRIX OF SAID WILLIAM BRAYTON MANN, DECEASED, ASSIGNOR TO THE WESTINGHOUSE AIR BRAKE COMPANY, OF PITTSBURGH, PENNSYLVANIA, A CORPORATION OF PENNSYLVANIA.

TRIPLE VALVE.

1,177,645. Specification of Letters Patent. Patented Apr. 4, 1916.

Application filed May 14, 1913. Serial No. 767,647.

*To all whom it may concern:*

Be it known that I, WILLIAM B. MANN, of Baltimore, Maryland, have invented a new and useful Improvement in Triple Valves, which invention is fully set forth in the following specification.

This invention relates to air brakes, and more particularly to triple valves for controlling the application and release of the brakes, and has for one of its objects to provide means whereby pressure in the brake cylinder is augmented by graduating the admission of air thereto, when the valve is in what is commonly known as the "quick service" and "full service" positions. This graduation is rendered almost simultaneous throughout the entire length of the train, thereby preventing injurious shocks to the rolling stock, by making a slight reduction in the train pipe pressure, admitting air therefrom and from the auxiliary reservoir to the brake cylinder. When subsequent equalization of pressure between the auxiliary reservoir and the train pipe occurs, the graduating valve, used in connection with the invention, moves to "lap" position and closes communication to the brake cylinder, and if it is found that such reduction is not sufficient for the desired application of the brakes, a further slight reduction will be made, again quickly admitting air to the brake cylinder, and this action may be repeated until the desired application is obtained. A "full service" application of the brakes may also be had by a further reduction of pressure in the train pipe, as in the case of short trains, in which instance, the triple valve automatically converts itself into a short train valve, or in other words, dispenses with the serial venting feature, as described in my pending application, Serial Number 321,778, by shutting off communication between the train pipe and the brake cylinder, and allowing only a feed from the auxiliary reservoir. These applications of the brakes are made possible in the present invention by the use of the graduating valve slidably mounted upon the large emergency valve and working in combination with the release valve also slidable on said emergency valve. This graduating valve controls the passage of air from the train pipe and auxiliary reservoir to the brake cylinder, and, in practice, is made very small and exceedingly light, and therefore quickly responsive to small air reductions at the engineer's valve.

This invention also includes the retarded release and recharging features of the above-mentioned pending application which have been found highly desirable and advantageous over former air brakes, in that injury is avoided which would otherwise occur when releasing the brakes on long trains. The increase in pressure at the forward end of the train pipe occurs much more quickly than at the rear end, the result being that the brakes are released on the forward cars of the train while they still remain applied at the rear thereof, this condition rendering liable the breaking of the train, owing to the drag occasioned. In order to overcome this difficulty and secure a more rapid rise of the air pressure in the train pipe throughout the length thereof, means are provided for restricting or retarding the passage of train pipe pressure to the auxiliary reservoirs on the forward part of the train, during substantially the same time that the restricted exhaust ports from the brake cylinders on the forward part of the train are closed.

In triple valves, as heretofore constructed, a valve operating piston is employed, having a partial traverse for service and graduating applications, and a full or further traverse for emergency applications of the brakes, and the throw of the piston upon the partial traverse has been limited by a spring-pressed abutment on the train pipe side of the piston. Besides involving additional expense and complication of construction, this spring-pressed abutment is objectionable because it has been found, in practice, that it is liable to get out of order and to more or less affect the efficiency of the entire valve, in that it does not absolutely prevent any undesirable emergency application.

This invention aims to overcome these objections by using the large emergency valve as a stop for the piston, said valve only moving upon a large reduction of pressure in the train pipe, and it has been found, in practice, that said valve provides a much better stop than the spring-pressed abutments formerly used. Another advantage of this form of construction is that there is nothing to retard the movement of the piston to emergency position, and hence such application may more quickly be obtained, when desired.

Another object is to compactly arrange the several parts of the triple valve in the valve casing, so as to produce the highest degree of efficiency and durability in operation, without increasing the complication of the same, to the end that the simplicity of the valve is maintained, and at the same time render the parts readily accessible for ordinary repairs.

The inventive idea involved is capable of receiving a variety of mechanical expressions, one of which, for the purpose of illustration, is shown in the accompanying drawings; but it is to be expressly understood that said drawings and the particular construction shown therein and described in the specification are employed simply for the purpose of facilitating the description of the invention as a whole and not for the purpose of defining the limits of the invention, reference being had to the claims for this purpose.

Referring to the drawings, in which like reference characters designate similar parts, 1 is the valve casing proper, which is of well known construction and provided with the coupling 2 where the train pipe is connected to the casing, and the port 3 leading to the brake cylinder.

Figure 7:
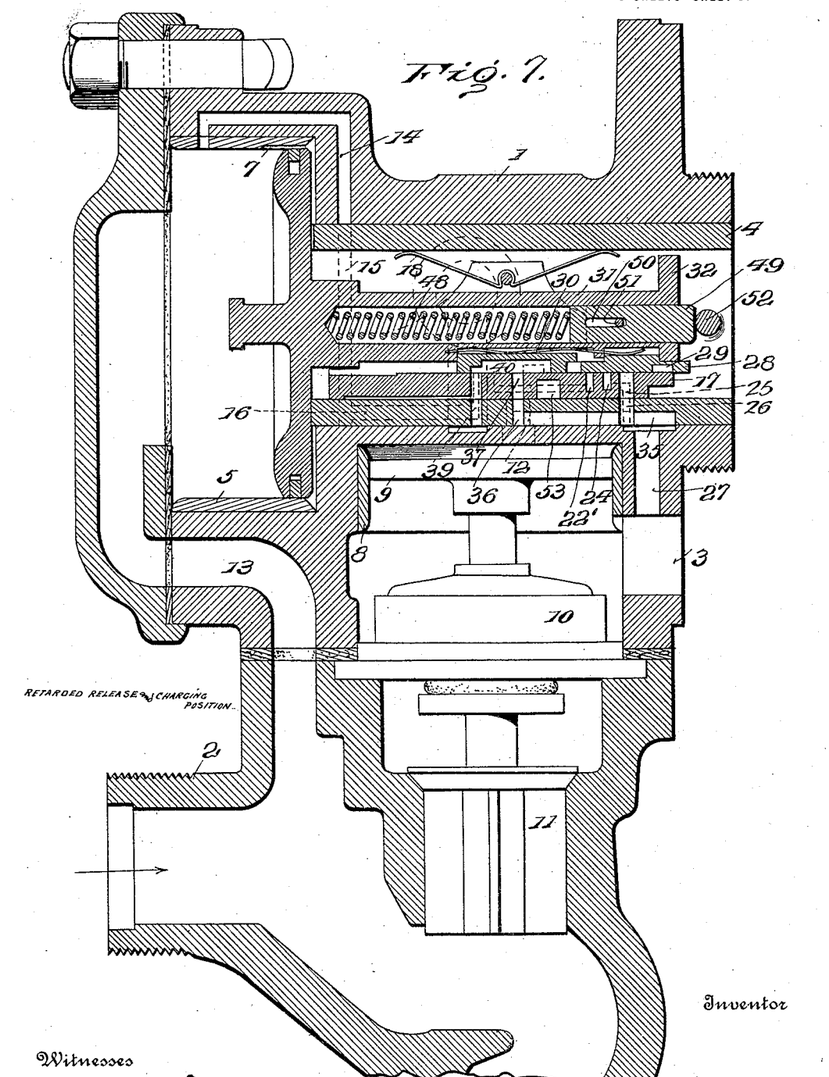
Fig. 7 is a view similar to Fig. 1 with the parts in the position they occupy for a restricted exhaust of brake cylinder pressure and restricted recharging of the auxiliary reservoir.

In the casing 1 there is mounted a valve bushing 4 which forms the valve chamber proper, and a bushing 5 which forms the cylinder in which the triple piston reciprocates, as in all standard valves. The left-hand end of the bushing 4 is ground, so as to form a close and air-tight joint between the end of the bushing and the adjacent face of the piston, so that when the latter rests against the end of the bushing, as shown in Fig. 7, the passage of air from the train pipe to the auxiliary reservoir will be cut off except through the small ports 6 in the end of the bushing. In the inner wall of the bushing 5 there is formed a groove 7, through which the air can pass from the train pipe around the piston and through the valve chamber to the auxiliary reservoir. There is also mounted in the casing 1 another bushing 8, in which is slidable the emergency piston 9 connected to a valve 10 of any well known construction, said emergency piston being adapted to raise the check valve 11 off of its seat, when pressure is admitted from the auxiliary reservoir through the port 12 in a manner to be hereinafter described.

Figure 12:
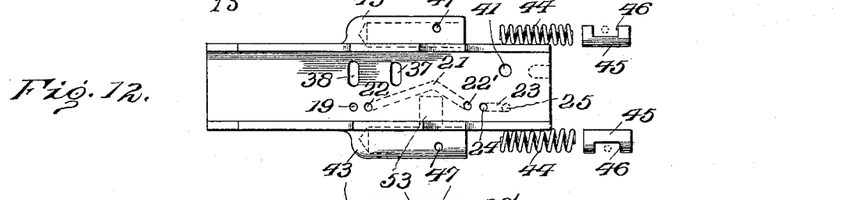
Fig. 12 is a top plan view of the emergency valve and spring abutments carried thereby.
Figure 13:
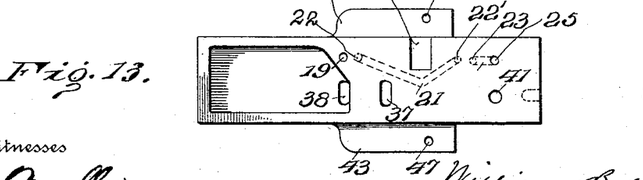
Fig. 13 is a bottom plan view of the emergency valve.

The valve casing 1 is provided with a conduit 13 which leads to the piston chamber, the latter having communicating therewith a passage 14, said passage connecting with a groove 15 formed partially around the periphery of the bushing 4, said groove terminating in a passage 16 extending longitudinally of the bushing. Mounted in the bushing 4 is the large emergency valve 17 which is held to its seat in any well known manner, such as by the spring 18. The valve 17 is provided with a small port 19 which registers with the passage 16, when the valve is in normal position, as shown more clearly in Fig. 5 of the drawings, thus permitting the passage of air from the train pipe as far as the release valve 20 which is slidably mounted upon the emergency valve 17. The valve 17 is also provided with a diagonal passage 21, as shown in dotted lines in Fig. 12, the ends of said passage communicating with ports 22 and 22' which open into the valve chamber proper. The valve 17 is further provided with another short passage 23, one end terminating in a port 24 adjacent the port 22', and communicating with the interior of the valve chamber, while the other end of said passage 23 terminates in a port 25 which registers with a similar port 26 in the bushing 4, said port 26 in turn communicating with the passage 27 leading to the brake cylinder port 3.

Figure 1:
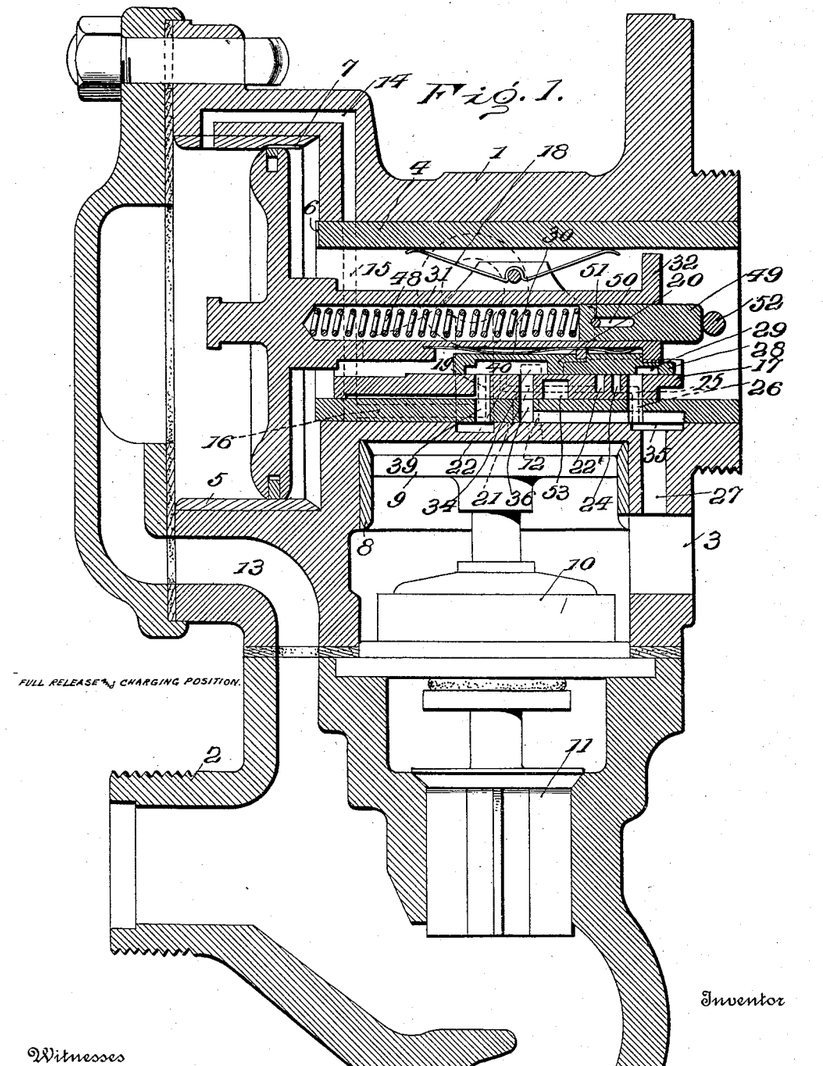
Figure 1 is a vertical longitudinal section of the triple valve with the parts in full release and charging position.

The release valve 20, when in the position shown in Fig. 1, is mounted to overlap the graduating valve 28 which is also slidable on the valve 17 and which is provided with a cavity 29 for connecting the ports 22′ and 24 in the valve 17 upon a certain reduction in train pipe pressure. The release valve 20 and the graduating valve 28 are held to their seats on the valve 17 by means of a leaf spring 30 carried by the piston stem 31, said stem having on its right-hand end a spider 32 which is adapted to engage the graduating valve 28, so as to move it and the release valve 20 to the left upon a reduction in train pipe pressure. The valve stem 31 is also provided, adjacent the spider 32, with a lug 33 which depends between the release valve 20 and the graduating valve 28 and is adapted to move the latter valve a slight distance independently of the release valve, when the pressure in the auxiliary reservoir is below that in the train pipe, it being understood that there is a certain amount of lost motion between the piston stem and the release valve. The latter valve is provided with a small cavity 34 which registers with the ports 19 and 22, when the triple piston moves a certain distance to the left, thereby admitting pressure from the train pipe through the passages 21 and 23 into the brake cylinder.

The valve bushing 4 is provided, adjacent to its right-hand end, with a longitudinal duct 35 which communicates at one end with the passage 27 leading to the brake cylinder, and at its other end with a port 36 in the bushing 4, said latter port registering with an exhaust port 37 formed in the valve 17. Adjacent the port 37, the valve 17 is also provided with a similar exhaust port 38 which registers with a port 39 formed in the bushing 4, said port 39 communicating with the atmosphere. The release valve 20 is provided with a cavity 40 which is sufficiently large to overlap the ports 37 and 38 in the valve 17, so that when in the position shown in Fig. 1, brake cylinder pressure is free to pass through the passage 27, duct 35, ports 36, 37 to the cavity 40, and thence through the ports 38 and 39 to the atmosphere. The valve 17 is also provided, adjacent its right-hand end, with a port 41 which registers with a similar port 42 in the valve bushing 4, said port 41 being closed by the graduating valve 28 when the brakes are in full release and charging position, but opened to permit auxiliary reservoir air to pass into the brake cylinder, when the triple piston is moved to the left by a reduction in train pipe pressure.

Figures 2, 3:
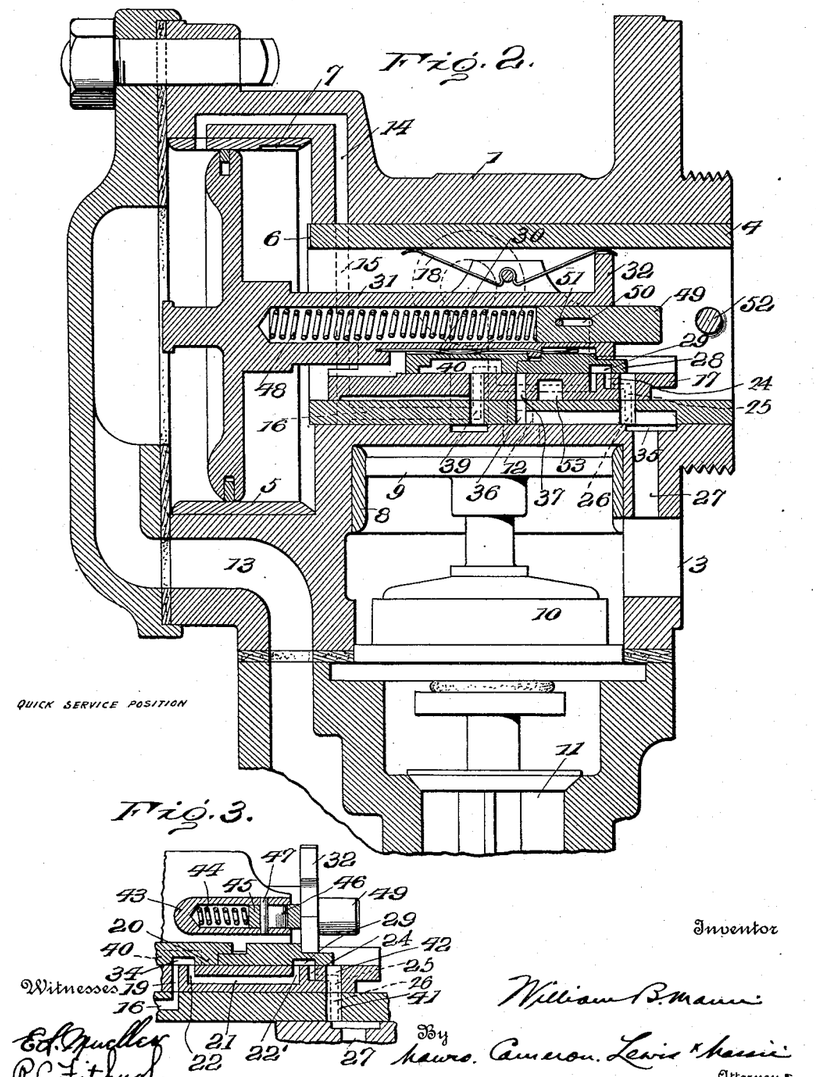
Fig. 2 is a view similar to Fig. 1, showing the parts in position for a quick service application of the brakes, the air passing from the train pipe to the brake cylinder and also from the auxiliary reservoir to the brake cylinder.
Fig. 3 is a fragmentary vertical longitudinal staggered section of certain of the parts in the position shown in Fig. 2.
Figures 4, 5:
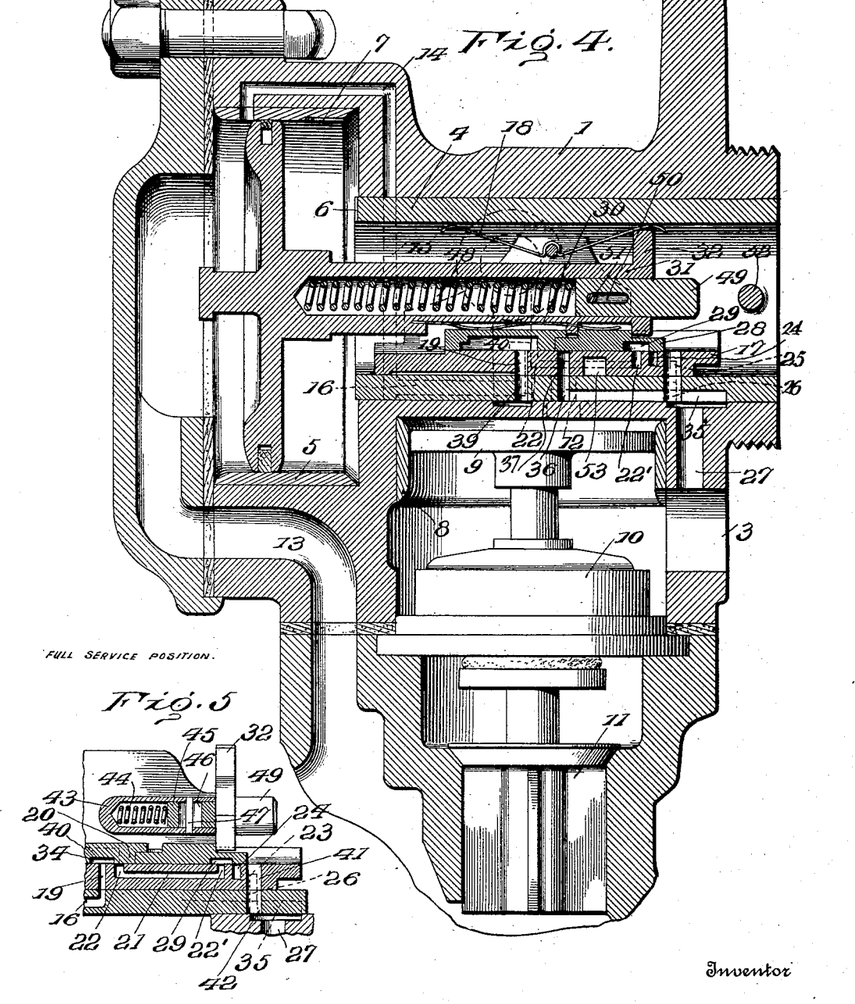
Fig. 4 is a view similar to Fig. 1, with the parts in position for a full service application, the air passing from the auxiliary reservoir to the brake cylinder.
Fig. 5 is a view similar to Fig. 3 with the parts in the position assumed in the full service application.

The main valve 17 is provided on its sides with oppositely disposed cylinders 43, 43 for the reception of expansion springs 44, 44 which act against the small abutments 45, 45 having slots 46 therein for the reception of pins 47 which are adapted to limit the movement of said abutments. These abutments are provided for the purpose of limiting the throw of the piston in the different service applications, as shown in Figs. 3 and 5, the spider 32 of the piston contacting with the abutments 45 and being stopped when the piston moves to the position shown in Fig. 2. Upon a further reduction of train pipe pressure and the movement of the piston farther to the left, the abutments are moved inwardly into the cylinders 43, thereby compressing the springs 44 therein until the spider contacts with the large valve 17, thus preventing any further movement of the piston toward emergency position. In the bore of the piston stem 31 there is a spring 48 reacting between the end of the bore and a stem 49 having a slot 50 therein for the reception of a pin 51 carried by said piston stem. When the piston moves to the extreme right and contacts with the bushing 4, the said stem 49 contacts with a pin 52 extending transversely of the bushing 4, thereby compressing the spring 48, this construction being well known and used in standard brakes. The valve 17 is also provided with a port 53 opening through one side thereof and adapted to register with the port 12 in the bushing 4 only upon emergency applications, thereby permitting air from the auxiliary reservoir to escape into the chamber above the emergency piston 9, forcing the same down and raising the check valve 11 off of its seat to permit train pipe pressure to pass into the brake cylinder.

*Operation.*—The operation of the valve will, for the sake of clearness, be described under five separate heads, viz., for quick service application of the brakes, full service application of the brakes, "lap" position, retarded release and recharging position, and emergency application of the brakes.

*Quick service applications.*—When quick service application of the brakes is desired, the engineer makes a slight reduction in the train pipe pressure, thereby causing the valve operating piston to shift to the position shown in Fig. 2. During this shifting operation, the emergency valve 17 is not moved. The release valve 20 and the graduating valve 28, however, are moved by reason of the engagement of the spider 32 with the graduating valve, and shifted from the position shown in Fig. 1 to that shown in Fig. 2. During the first part of this shifting movement, communication between the ports 37 and 38 through the cavity 40 in the release valve is closed, thereby cutting off the brake cylinder from the atmosphere, and directly after this closure occurs, communication is established between the ports 19 and 22 by reason of the small cavity 34 in the release valve registering therewith. The graduating valve 28, also moving to the left, brings the cavity 29 therein into registration with the ports 22' and 24, thus establishing communication from the train pipe through the passage 14, groove 15, passage 16, ports 19 and 22, passage 21, ports 22' and 24, passage 23, port 25 and passages 26 and 27 to the brake cylinder. There is thus a certain amount of air taken from the train pipe at each triple valve, and the pressure in the train pipe is therefore diminished rapidly throughout the entire length of the train, but not sufficiently to produce an emergency application of the brakes. Upon the movement of the graduating valve 28, as just described, the same also partially uncovers the port 41 in the valve 17 and permits auxiliary reservoir air to pass into the brake cylinder by port 41, port 42, and passage 27, thus augmenting the pressure in the brake cylinder received from the train pipe, and thereby producing a quick application of the brakes. The movement of the valve operating piston to the left is limited by the spider 32 contacting with the abutments 45 carried by the large valve 17, so that the cavities in the release and graduating valves will be brought into exact registration with the respective ports in the large valve 17, thus insuring a positive feed from the train pipe through the passages in the said valve 17 to the brake cylinder.

*Full service application.*—When a further reduction is made in the train pipe pressure, as is the case with short trains, the piston will travel farther to the left, as shown in Fig. 4, carrying with it the release and graduating valves, until the cavities 34 and 29, respectively, therein have moved past the ports 19 and 22, and 22' and 24, thus cutting off communication between the train pipe and brake cylinder through the passages of the valve 17. The further movement of the graduating valve 28 to the left totally uncovers the port 41 in the valve 17, and thus permits of an unobstructed passage of the auxiliary reservoir air to the brake cylinder. The movement of the piston to the full service position is again limited by reason of the contact between the spider 32 and the abutments 45 which, in this position, are forced inwardly into the cylinders 43, compressing the springs 44 therein until the said spider contacts with the large valve 17, as clearly shown in Fig. 5 of the drawings.

Figure 6:
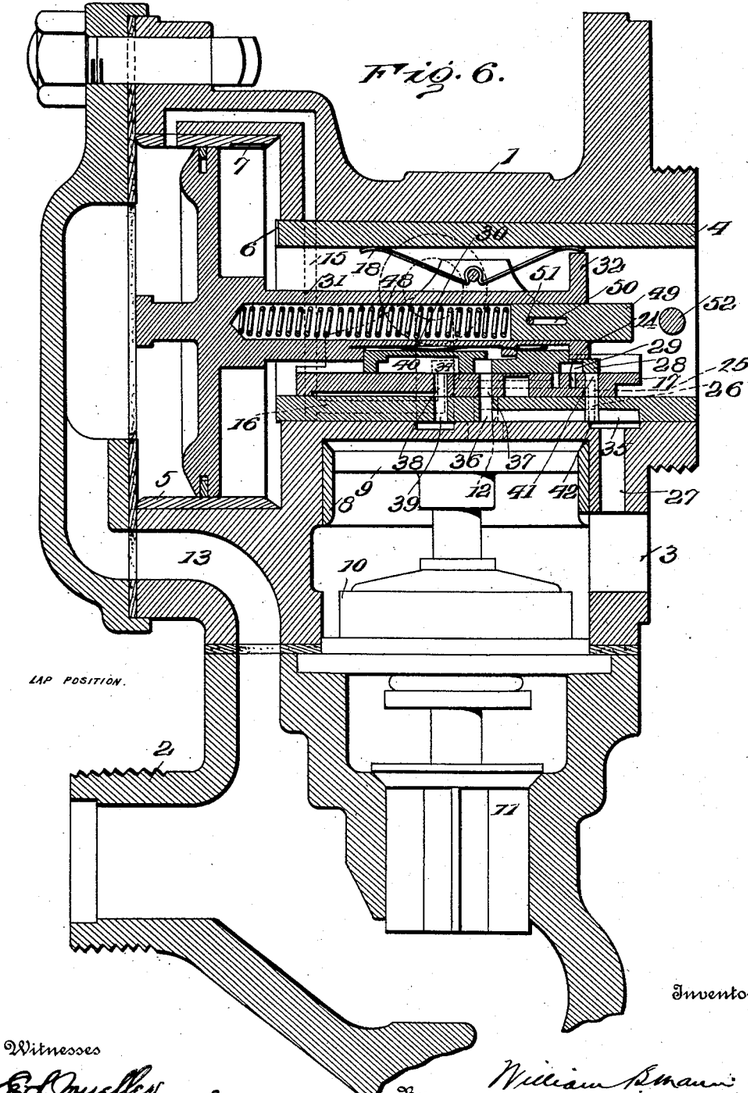
Fig. 6 is a view similar to Fig. 1 with the parts in "lap" position, communication between the auxiliary reservoir and the brake cylinder being closed by the graduating valve.

*Lap position.*—Referring again to Figs. 2 and 4, and also to Fig. 6, it will be seen that when the pressure in the auxiliary reservoir has been reduced to a point slightly below that in the train pipe, the valve operating piston moves from left to right for a very slight distance, such movement being sufficient to cause the graduating valve 28 to overlap the port 41 in the valve 17, thus cutting off communication between the auxiliary reservoir and the brake cylinder. This movement of the valve 28 also closes communication between the ports 22' and 24 in the valve 17, thereby preventing a feed from the train pipe to the brake cylinder. It will be clearly seen from an inspection of Fig. 6 that the graduating valve moves independently of the release valve by reason of the lost motion between the latter and the piston, said graduating valve being moved by the lug 33 depending from the valve stem 31 between the release and graduating valves and engaging the latter. Should it be found desirable to increase further the pressure in the brake cylinder, or as it is technically known, to "graduate" the application, a slight additional decrease in the train pipe pressure will again cause the piston to shift to the position shown in Fig. 2, when communication is again established between the train pipe and brake cylinder, and the auxiliary reservoir and brake cylinder. This operation may be repeated as many times as desired, until equalization of pressure between the train pipe and brake cylinder occurs. As has been before stated, the graduating valve is made very small and light, and by reason of this, it will be clearly seen that rapidity of action and sensitiveness of the device, when "graduating" the application of the brakes, is assured. It is also to be observed that when the parts are in "lap" position, there is a slight difference between the location of the release valve in Figs. 2 and 4, said valve in Fig. 2 connecting the ports 19 and 22, while in Fig. 4 communication between said ports is closed.

*Retarded release and charging position.*—When it is desired to release the brakes, the engineer increases the pressure in the train pipe, in the usual way, and the valve operating piston is thrown to the position shown in Fig. 7 on those cars which are at the forward part of the train. During this movement, the graduating valve 28 first closes communication between the auxiliary reservoir and the brake cylinder, and the further movement of the piston causes the stem 49 carried in the bore of the piston stem to abut the pin 52, which results in the compression of the spring 48 between the inner end of said stem 49 and the inner end of the bore. During this further movement of the piston, the same contacts with the release valve 20, moving the same to the right until the restricted portion of the cavity 40 therein directly overlaps the port 38 in the valve 17, thereby leaving but a restricted passage of brake cylinder pressure to the atmosphere. The brakes, when the parts are in this position, are very slowly released. During this time, a very small amount of air is permitted to pass from the train pipe to the auxiliary reservoir, since the unobstructed passage through the duct 7 in the piston chamber into the valve chamber and thence to the auxiliary reservoir is closed by the ground joint between the valve piston and bushing 4.

The small amount of air which is permitted to pass from the train pipe to the auxiliary reservoir feeds through the duct 7 and small ports 6 in the end of the bushing 4. It is, therefore, seen that there is only a very slight reduction of train pipe pressure, caused by the passage of air to the auxiliary reservoirs on the cars at the forward part of the train. The result is that the increased pressure in the train pipe is rapidly transmitted throughout the entire length of the train, the pressure, when it reaches the rear end of the train pipe, being but slightly below that on the forward end of the train. This difference, however, is sufficient to effect a retarded release of the brakes on the forward cars and the prompt release of the brakes on the rear cars. When the pressure in the train pipe is decreased, by reason of the recharging of the auxiliary reservoirs, the tension of the spring 48, which is now compressed, serves to gradually shift the valve operating piston to the left, thus moving the parts from the position shown in Fig. 7 to the full release position shown in Fig. 1, thereby fully opening the exhaust from the brake cylinder to the atmosphere, by reason of the shifting of the release valve 20 to its full release position.

As above explained, when the parts are in position for restricted release of the brakes, air from the train pipe can only pass to the auxiliary reservoir through the duct 7 and small ports 6, so that on the cars at the forward part of the train there is but a slow recharging of the auxiliary reservoirs, until the time when the parts shift from the position shown in Fig. 7 to that shown in Fig. 1, at which time a full volume of air is permitted to pass around the valve operating piston to the auxiliary reservoirs, until the pressure between the train pipe and the auxiliary reservoirs equalizes.

It will be observed from the foregoing that during the time when the brake cylinder is in restricted communication with the atmosphere, the auxiliary reservoir is also in restricted communication with the train pipe, and that the parts are gradually returned to their normal position, shown in Fig. 1, by the action of the spring 48, full and unrestricted communication between the train pipe and the auxiliary reservoir being restored by reason of the piston moving away from the ground end of the bushing 4.

Figure 8:
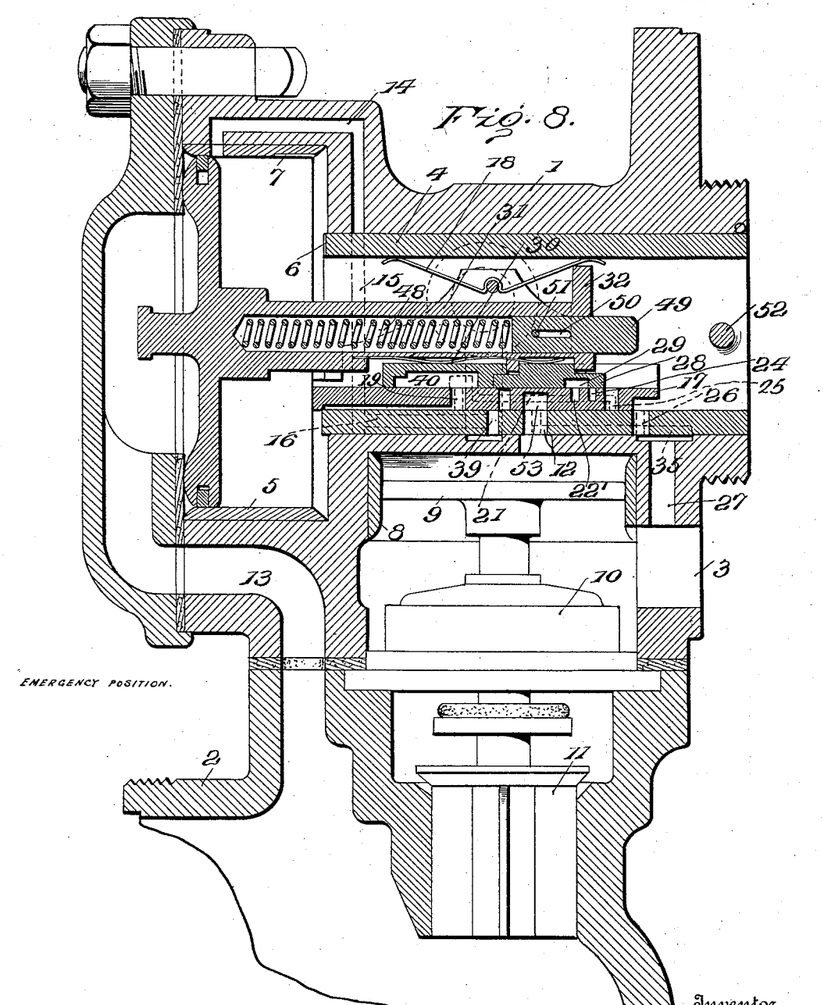
Fig. 8 is a view similar to Fig. 1 showing the parts in the emergency application of the brakes.
Figure 9:
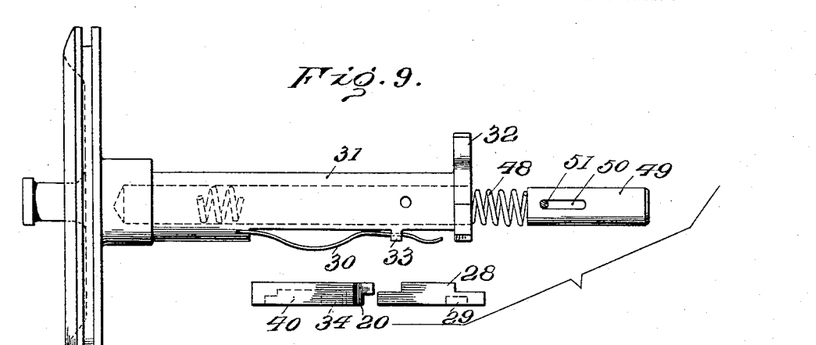
Fig. 9 is a detail view in side elevation of the triple piston, release and graduating valves.
Figure 10:
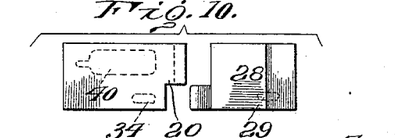
Fig. 10 is a top plan view of the release and graduating valves.
Figure 11:
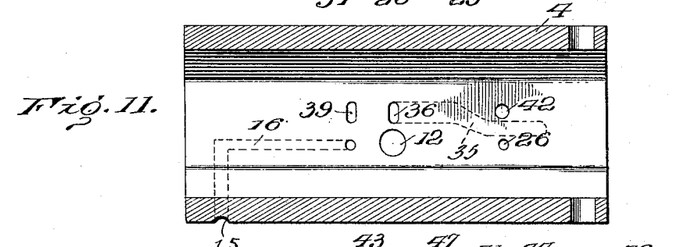
Fig. 11 is a longitudinal section of the valve bushing, showing the ports and passages therein.

*Emergency application.*—For emergency application of the brakes, the engineer makes a large reduction in the train pipe pressure, thus throwing the piston to the position shown in Fig. 8. During the first part of this movement of the piston, communication from the brake cylinder to the atmosphere is closed and communication from the train pipe to the brake cylinder, and the auxiliary reservoir and the brake cylinder is, for an instant, established, as shown in Fig. 2. Upon further movement of the piston to the left, the spider 32 contacts with the emergency valve 17, carrying the same with it until the port 53 therein registers with the port 12, thereby permitting auxiliary reservoir pressure to pass into the chamber above the emergency piston 9 and force the same down, which movement opens the valve 10, thus reducing the pressure above the check valve 11. This valve instantly rises by reason of pressure in the train pipe, which pressure passes directly through the port 3 into the brake cylinder until equalization occurs between the latter and the train pipe, when the check valve is forced to its seat by a spring (not shown) which prevents brake cylinder pressure from flowing back into the train pipe. At the same time that the port 53 comes into registration with the port 12, the large valve uncovers the ports 26 and 42 in the valve bushing 4, and permits auxiliary reservoir air to pass into the brake cylinder. But the size of said ports is such that only a very small amount of air passes into the brake cylinder before the check valve is reseated.

A study of the construction shown in the accompanying drawings will disclose the fact that without increasing the number of parts or varying the sensitiveness of action of the valve, and, furthermore, without adding to the expense of construction, this invention has materially increased the functions of any triple valve now in use.

What is claimed is:

1. In a triple valve, the combination of a piston operated according to variations in train pipe pressure, an emergency valve having exhaust ports communicating with the brake cylinder, a release valve slidable on said emergency valve for controlling the ports therein, and a graduating valve slidable on said emergency valve and movable with said release valve upon a reduction of train pipe pressure.

2. In a triple valve, the combination of a piston operated according to variations in train pipe pressure, an emergency valve having exhaust ports communicating with the brake cylinder, a release valve slidable on said emergency valve for controlling the ports therein, and a graduating valve slidable on said emergency valve and movable with said release valve upon a reduction of train pipe pressure and relative to said release valve upon a preponderance of pressure on the train pipe side of the piston.

3. In a triple valve, the combination of a piston operated according to variations in train pipe pressure, an emergency valve having exhaust ports communicating with the brake cylinder, a release valve slidable on said emergency valve for controlling the ports therein, a graduating valve slidable on said emergency valve and movable with said release valve upon a reduction of train pipe pressure and relative to said release valve upon a preponderance of pressure on the train pipe side of the piston, and means on said piston for moving said graduating valve relatively to said release valve.

4. In a triple valve mechanism, the combination of a piston operated according to variations in train pipe pressure, an emergency valve having exhaust ports communicating with the brake cylinder, a graduating valve slidable on said emergency valve, a release valve also slidable on said emergency valve and overlapping said graduating valve during equalization of pressure between the train pipe and auxiliary reservoir.

5. In a triple valve mechanism, the combination of a piston operated according to variations in train pipe pressure, an emergency valve having exhaust ports communicating with the brake cylinder, a graduating valve slidable on said emergency valve, a release valve also slidable on said emergency valve and overlapping said graduating valve during equalization of pressure between the train pipe and auxiliary reservoir, said graduating valve being movable with said release valve upon a reduction of train pipe pressure and relative to said release valve upon a preponderance of pressure on the train pipe side of the piston.

6. In a triple valve mechanism, the combination of a piston operated according to variations in train pipe pressure, an emergency valve having exhaust ports communicating with the brake cylinder, a graduating valve slidable on said emergency valve, a release valve also slidable on said emergency valve and overlapping said graduating valve during equalization of pressure between the train pipe and auxiliary reservoir, said graduating valve being movable with said release valve upon a reduction of train pipe pressure and relative to said release valve upon a preponderance of pressure on the train pipe side of the piston, and means on said piston for moving said graduating valve relative to said release valve.

7. In a triple valve mechanism, the combination of a piston operated according to variations in train pipe pressure, an emergency valve, means carried by said valve for limiting the movement of said piston upon certain reductions in train pipe pressure, a release valve slidable on said emergency valve, and a graduating valve slidable on said emergency valve for controlling the admission of air to the brake cylinder.

8. In a triple valve mechanism, the combination of a piston operated according to variations in train pipe pressure, an emergency valve having passages for the admission of air from the train pipe to the brake cylinder and a port for connecting the auxiliary reservoir with the brake cylinder, a release valve for controlling the admission of air through said passages, and a graduating valve coöperating with said release valve for controlling the admission of air through said passages and said port upon a slight reduction of pressure in the train pipe.

9. In a triple valve mechanism, the combination of a piston operated according to variations in train pipe pressure, an emergency valve having passages for the admission of air from the train pipe to the brake cylinder, and a port for connecting the auxiliary reservoir with the brake cylinder, a release valve slidable on said emergency valve for controlling the admission of air through said passages, and a graduating valve also slidable on said emergency valve and coöperating with said release valve for controlling the admission of air through said passages and said port upon a slight reduction of pressure in the train pipe.

10. In a triple valve mechanism, the combination of a piston operated according to variations in train pipe pressure, an emergency valve having passages for the admission of air from the train pipe to the brake cylinder, and a port for connecting the auxiliary reservoir with the brake cylinder, a release valve slidable on said emergency valve for controlling the admission of air through said passages, a graduating valve also slidable on said emergency valve and coöperating with said release valve for controlling the admission of air through said passages and said port upon a slight reduction of pressure in the train pipe, and means carried by the piston for actuating said graduating valve to close said passages and port upon equalization of pressure between the train pipe and auxiliary reservoir.

11. In a triple valve mechanism, the combination of a piston operated according to variations in train pipe pressure, an emergency valve having passages for the admission of air from the train pipe to the brake cylinder and a port for connecting the auxiliary reservoir with the brake cylinder, a release valve for admitting pressure through said passages upon a partial traverse of said piston and closing said passages upon a further traverse, and a graduating valve movable with said release valve for admitting pressure through said passages and said port to the brake cylinder upon a partial traverse and closing said passages upon a further traverse.

12. In a triple valve mechanism, the combination of a piston operated according to variations in train pipe pressure, an emergency valve having passages for the admission of air from the train pipe to the brake cylinder, and a port for connecting the auxiliary reservoir with the brake cylinder, a release valve slidable on said emergency valve for admitting pressure through said passages upon a partial traverse of said piston and closing said passages upon further traverse, and a graduating valve also slidable on said emergency valve and movable with said release valve for admitting pressure through said passages and said port to the brake cylinder upon a partial traverse and closing said passages upon a further traverse.

13. In a triple valve mechanism, the combination of a piston operated according to variations in train pipe pressure, an emergency valve having passages for the admission of air from the train pipe to the brake cylinder and a port for connecting the auxiliary reservoir with the brake cylinder, and a graduating valve having a cavity therein for connecting said passages upon a slight reduction of train pipe pressure, said graduating valve also opening communication between the auxiliary reservoir and brake cylinder through said port upon such reduction.

14. In a triple valve mechanism, the combination of a piston operated according to variations in train pipe pressure, an emergency valve having passages for the admission of air from the train pipe to the brake cylinder and a port for connecting the auxiliary reservoir with the brake cylinder, and a graduating valve slidable on said emergency valve and having a cavity therein for connecting said passages upon a slight reduction of train pipe pressure, said graduating valve also opening communication between the auxiliary reservoir and brake cylinder through said port upon such reduction.

15. In a triple valve mechanism, the combination of a piston operated according to variations in train pipe pressure, an emergency valve, a release valve slidable on said emergency valve and having a full release and a retarded release position, and a graduating valve also slidable on said emergency valve and having movement relative to said release valve prior to the movement of the latter to retarded release position.

16. In a triple valve mechanism, the combination of an emergency valve, a graduating valve and a valve operating piston operated by variations in train pipe pressure and each having a quick service position and a full service position, and means carried by the emergency valve for limiting the movement of said piston in either of said positions.

17. In a triple valve, the combination of a valve operating piston, an emergency valve, a valve having a full release position and a restricted release position, a graduating valve slidable on said emergency valve for controlling the passage of air from the train pipe and auxiliary reservoir to the brake cylinder, and means carried by said piston for moving said release valve from restricted release position to full release position.

18. In a triple valve, the combination of a valve operating piston, an emergency valve movable only on emergency applications, a valve having a full release and a restricted release position, and a graduating valve slidable on said emergency valve for controlling the passage of air from the train pipe and auxiliary reservoir to the brake cylinder.

19. In a triple valve, the combination of a valve operating piston, an emergency valve through which the exhaust from the brake cylinder passes to release the brakes, a valve having a full release position and a restricted release position, and a graduating valve slidable on said emergency valve for controlling the passage of air from the train pipe and auxiliary reservoir to the brake cylinder.

20. In a triple valve, the combination of a valve operating piston, an emergency valve movable only on emergency applications, a valve having a full release position and a restricted release position, a graduating valve slidable on said emergency valve for controlling the passage of air from the train pipe through the emergency valve to the brake cylinder and also controlling the passage of air from the auxiliary reservoir to the brake cylinder, and means carried by said piston for moving said release valve from restricted release position to full release position.

In testimony whereof I have signed this specification in the presence of two subscribing witnesses.

WILLIAM BRAYTON MANN.

Witnesses:
G. WILTON BENSON,
ALBERT H. CARROLL.